March 29, 1955  J. R. WELSCH  2,704,890
TOOL GAUGE
Filed Aug. 31, 1953
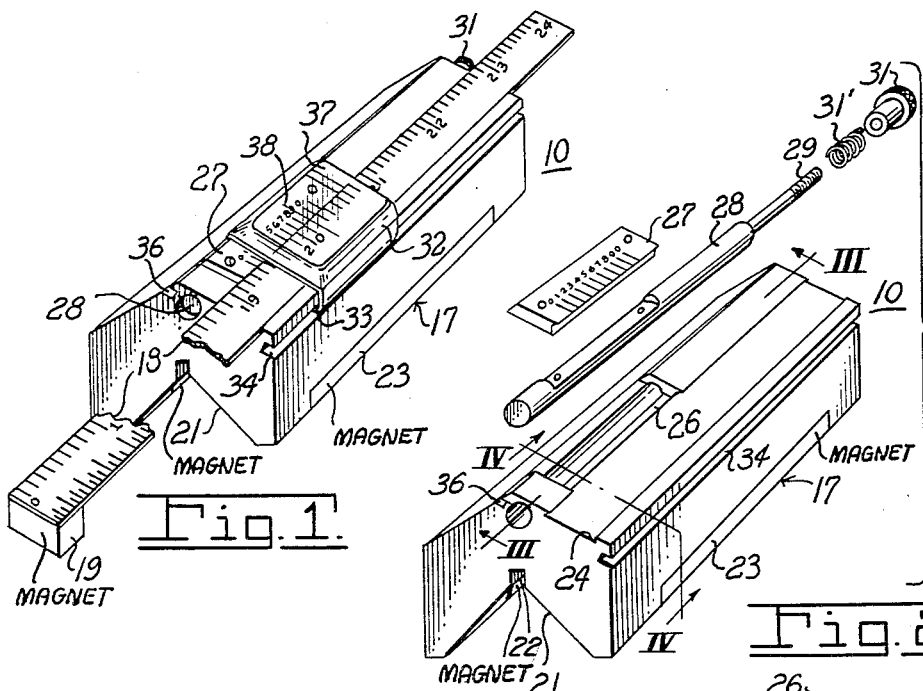
Fig. 1.
Fig. 2.
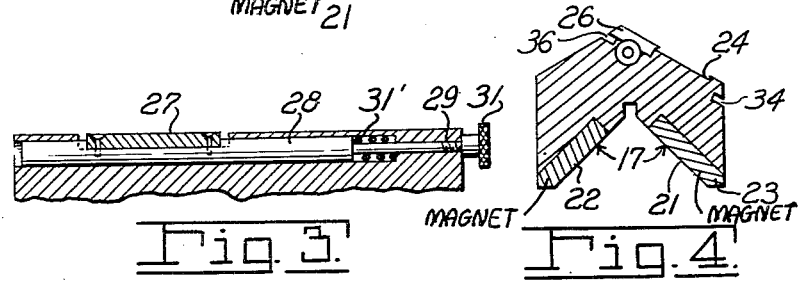
Fig. 3.
Fig. 4.
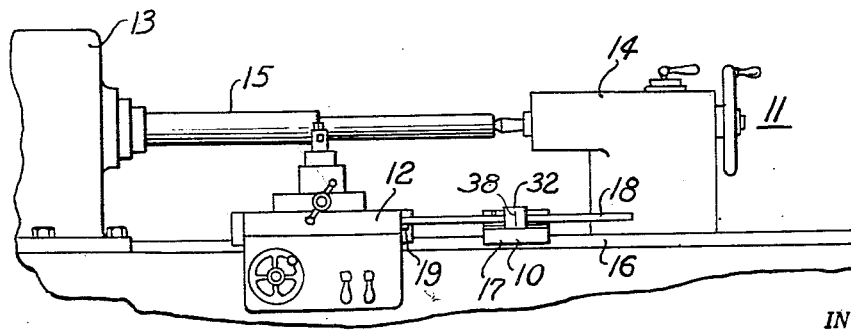
Fig. 5.
INVENTOR.
JOSEPH R. WELSCH
BY
Zugelter & Zugelter
Attys.

United States Patent Office 2,704,890
Patented Mar. 29, 1955

2,704,890

TOOL GAUGE

Joseph R. Welsch, Reading, Ohio

Application August 31, 1953, Serial No. 377,520

2 Claims. (Cl. 33—125)

This invention relates to a gauge for measuring the length of travel of the carriage of a cutting tool of a machine tool.

An object of this invention is to provide a gauge having a block which can be seated on the ways of a machine tool close to the tool carriage, and having a scale member provided with a magnet by which the scale member can be attached to the carriage to move therewith, the scale being slidably mounted in a track in the block.

A further object of this invention is to provide a gauge of this type having a magnet mounted in the block for holding the block on the ways.

A further object of this invention is to provide a gauge of this type, having an index member slidably mounted on the block adjacent to the scale track for locating or marking the position of predetermined scale indicia at the start of a cut.

A further object of this invention is to provide a gauge of this type, having a vernier attachment which can be moved along an edge of the scale track parallel thereto, for marking the position of predetermined scale indicia at the start of a cut.

From the following detailed description and the accompanying drawing, the above and other objects and features of the invention will be apparent to those having ordinary skill in the art to which it pertains:

In the drawing:

Figure 1 is a perspective view showing a gauge constructed in accordance with an embodiment of this invention;

Fig. 2 is an exploded perspective view of the gauge illustrated in Fig. 1;

Fig. 3 is a view in section taken along a line III—III, in Fig. 2;

Fig. 4 is a view in section taken along a line IV—IV, in Fig. 2; and

Fig. 5 is a view in side elevation showing a lathe having a gauge mounted thereon.

In the following detailed description and the drawing, like reference characters indicate like parts.

In the drawing, a gauge 10 is illustrated which is adapted for use on a machine tool 11 (Fig. 5) for measuring the length of travel of the cutting tool carriage 12. As shown in the drawing, the machine tool 11 is a lathe having a head stock 13 and a tail stock 14, with a workpiece 15 supported thereby.

The cutting tool carriage 12 moves parallel to the workpiece 15 on a way 16 of the machine. The gauge 10 is mounted and secured by magnetic means 17 on the way (see Figs. 1, 2 and 4). The gauge is provided with a scale 18, the end of which is provided with magnetic means 19 for attaching the same to the cutting tool carriage 12 (Fig. 5), so that, as the carriage moves along the way, the length of travel of the cutting tool can be accurately measured.

The gauge 10 comprises a block having a V-shaped groove 21 on the under side thereof and a V-shaped top. The block is preferably made of non-magnetic material, such as aluminum. The magnetic means 17 comprises permanent base magnets 22 and 23 secured in slots in the faces of the V-notch 21, as shown. These bar magnets hold the gauge block 10 on the way of the machine tool. In one face of the top of the block a track or slideway 24 is formed in which the scale 18 is slidably mounted. One end of that scale is provided with the aforesaid magnetic means in the form of a permanent magnet 19 by means of which the scale may be attached to the tool carriage 12 (Fig. 5). The upper face of the block is also provided with a recessed slot 26 adjacent the scale slideway 24, for receiving a vernier scale 27. The vernier scale 27 is mounted on a slide rod 28 extending through a bore in the top of the block, and the bottom of the vernier scale recess 26. One end of the vernier scale rod is threaded as indicated at 29.

A knurled knob 31 is threaded on the threaded end of the rod 28 so that, by turning the knob, the vernier scale rod 28 can be moved back and forth in its bore, thereby moving the vernier scale back and forth in a direction parallel to the scale 18. A compression spring 31' is provided for urging the vernier scale rod in a direction to keep the threads tight and thereby avoid backlash in the vernier adjustment.

In order that the scale readings on scale 18 may be accurately read, a slide 32 is provided. That slide is provided with flanges 33 (only one of which is shown) at its opposite edges that are received in slots 34 and 36 in the block. The slide 32 is provided with a transparent member 37 which overlies the slideway 24 and on which is formed a cross-hair 38 by means of which the lines of the vernier scale may be lined up with the graduations of scale 18.

When a cut is to be made, the block 10 is mounted on the ways of the lathe 11, and the magnet 19 at the head of the scale member 18 is brought into engagement with the tool carriage 12. Then the carriage may be advanced until it reaches the position at which the start of a cut is to be made. Then the index slide 32 is advanced along the scale member 18 to predetermined scale indicia, and the vernier scale member is adjusted along the scale member until the zero scale line of the vernier scale member is aligned with one of the lines on the scale member 18. Then a cut is started, and the length of the cut can readily be determined by watching the movement of the scale member 18 with relation to the index slide 32 and the vernier scale member 27. The length of the cut is measured by the distance the scale member 18 moves with relation to the block.

Cuts can be made with great accuracy with the aid of the gauge illustrated in the drawing, and described above.

The gauge illustrated in the drawing and described above is subject to structural modification without departing from the spirit and scope of the appended claims.

Having described my invention, what I claim as new and desire to secure by Letters Patent is:

1. A gauge for measuring the length of travel of the carriage of a cutting tool of a machine tool, which comprises an elongated block having a track in one face thereof, there being an inverted V-shaped groove in another face of the block, parallel to the track and adapted to seat on the ways of a machine tool, a permanent magnet mounted in the grooved face for holding the block on the ways, an elongated scale member slidably received in said track, a permanent magnet attached to one end of the scale member and releasably engageable with the carriage of said tool, whereby the scale member moves with the carriage and the length of the cut is measured by the movement of the scale relative to the block, and an index member slidably mounted on said block overlying the track and scale, said index member being slidable along the track, said index member having an indicator for marking the position of predetermined scale indicia at the start of a cut.

2. A gauge for measuring the length of travel of the carriage of a cutting tool of a machine tool, which comprises an elongated block having a track in one face thereof, a permanent magnet mounted in another face thereof, said other face being adapted to seat on the ways of a machine tool with the magnet holding the block on the ways with the track parallel to the ways, an elongated scale member slidably received in said track, a permanent magnet mounted on one end of the scale member and releasably engageable with the carriage of the tool, whereby the scale member moves with the carriage, a vernier scale member slidably mounted on the block alongside of the elongated scale, means for moving the vernier scale parallel to the track, and an index member slidably mounted on said block overlying the track and the elongated scale, said index member being slidable along the track, said index member having an indicator for marking the position of predetermined scale indicia at the start of a cut.

References Cited in the file of this patent

UNITED STATES PATENTS

| | | |
|---|---|---|
| 456,553 | Carr | July 28, 1891 |
| 804,067 | Stowe | Nov. 7, 1905 |
| 809,037 | Walker | Jan. 2, 1906 |
| 1,329,911 | Lenti | Feb. 3, 1920 |
| 2,337,248 | Koller | Dec. 21, 1943 |

FOREIGN PATENTS

| | | |
|---|---|---|
| 263,688 | Switzerland | Dec. 1, 1949 |